Figure 1:
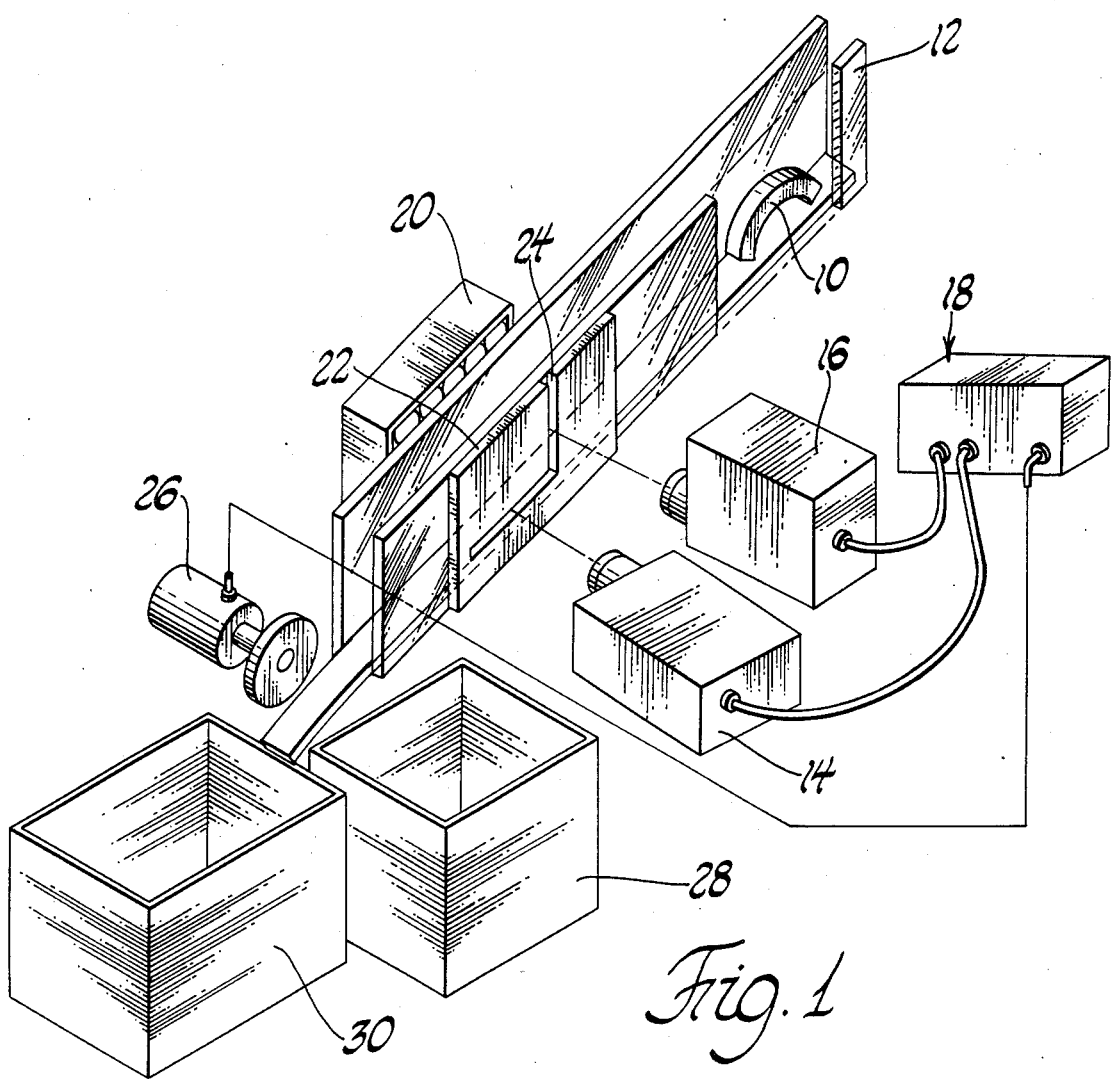

United States Patent [19]

Iadipaolo et al.

[11] Patent Number: 4,678,920
[45] Date of Patent: Jul. 7, 1987

[54] MACHINE VISION METHOD AND APPARATUS

[75] Inventors: Rene M. Iadipaolo, Southfield; Richard J. Tkaczyk, Plymouth, both of Mich.

[73] Assignee: General Motors Corporation, Detroit, Mich.

[21] Appl. No.: 745,079

[22] Filed: Jun. 17, 1985

[51] Int. Cl.⁴ .............................................. G01N 21/86
[52] U.S. Cl. ...................................... 250/560; 356/376
[58] Field of Search ...................... 356/376, 386, 387; 358/101, 107; 250/560, 561

[56] References Cited

U.S. PATENT DOCUMENTS 4,105,925  8/1978  Rossol et al. ....................... 356/376
4,394,683  7/1983  Liptay-Wagner et al. ......... 356/376
4,527,243  7/1985  Loose .................................. 358/101

OTHER PUBLICATIONS

"Machine-Vision Maker Sees Industrial Inspection Rather Than Robots as its Major Market" Weber *Electronics Week* 7/30/84 pp. 31–32.

Primary Examiner—David C. Nelms
Assistant Examiner—Crystal D. Cooper
Attorney, Agent, or Firm—Warren D. Hill

[57] ABSTRACT

A first linear sensor tracks the movement of an object through an inspection station and a second linear sensor views the object transverse to the object path to acquire a line image of the object, and a synchronizing arrangement responds to the sensed position of the object to trigger the second sensor at spaced object positions to obtain a plurality of line images which cummulatively represent the object image. The image is compared, line-by-line, as acquired with a stored model of the object to determine the correlation between the object and the model.

8 Claims, 4 Drawing Figures

MACHINE VISION METHOD AND APPARATUS

FIELD OF THE INVENTION

This invention relates to a method and apparatus for acquiring the image of a moving object.

BACKGROUND OF THE INVENTION

In industrial manufacture it is often required to inspect parts at a rapid rate to assure that they conform to a specified size and shape. This has been done at a slow rate by the use of optical comparators or by mechanical templates to compare a part to a master shape. Machine vision devices have also been used for this purpose. For example, the system shown in the patent to Rossol et al. U.S. Pat. No. 4,105,925 senses the boundaries of an object on a moving conveyor with the aid of structured lighting. Another arrangement uses a photocell to detect the presence of a moving object to trigger a two dimensional array camera. If a high resolution two dimensional camera is used to accurately capture the details of the moving object an extremely large amount of data is collected thereby requiring either extremely fast processing or a long delay to assimilate the data.

SUMMARY OF THE INVENTION

It is an object of this invention to provide a method and apparatus for acquiring the image of a moving object characterized by high resolution imaging with a minimal amount of image data.

Another object of the invention is to provide such a method and apparatus for acquiring the image in near real time.

The method of the invention is carried out by moving the object through a path, sensing the position of the object at many points along the path to produce position signals, and sensing line images of the object in response to the position signals to obtain a plurality of line images which cumulatively represent the object image.

The apparatus of the invention is carried out by means for moving the object along a path, a first linear sensor for tracking the object along the path and generating position signals, a second linear sensor viewing the object in a plane transverse to the path for generating data representing line images of the object profile, and a synchronizing circuit responsive to signals from both sensors for outputting data from the second sensor upon predetermined increments of movement to obtain many line images which cumulatively represent the object image.

EMBODIMENT OF THE INVENTION

Figure 2:
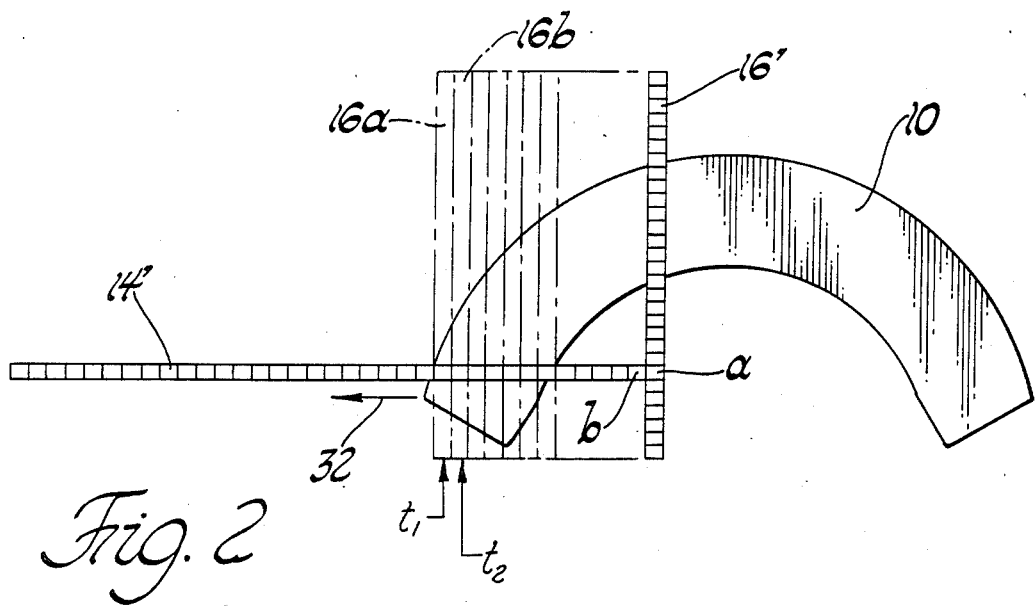
Figure 3:
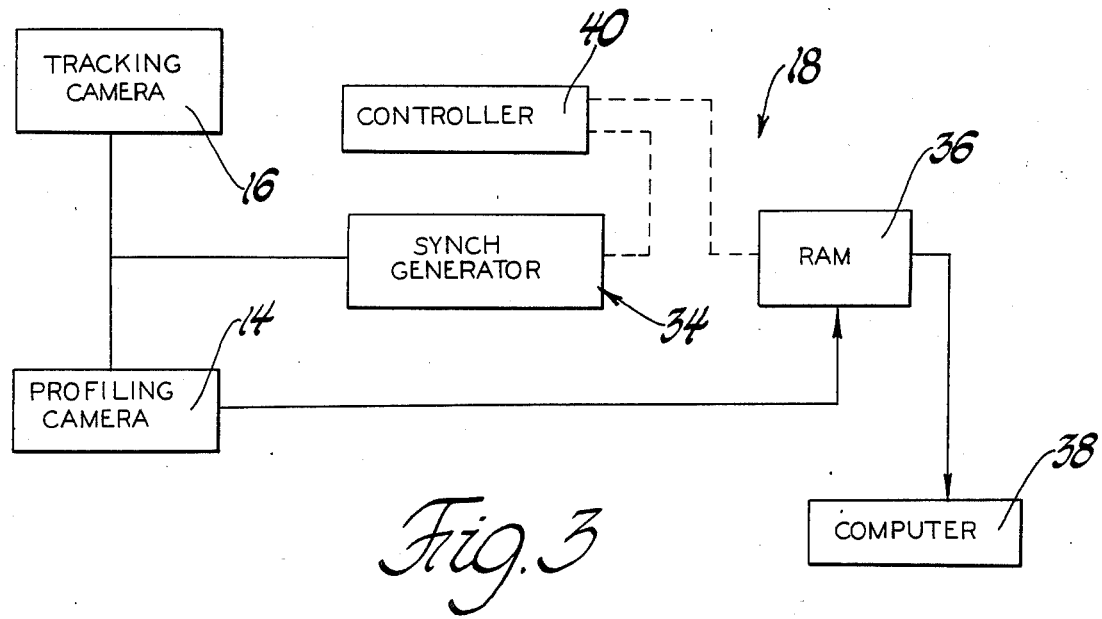
Figure 4:
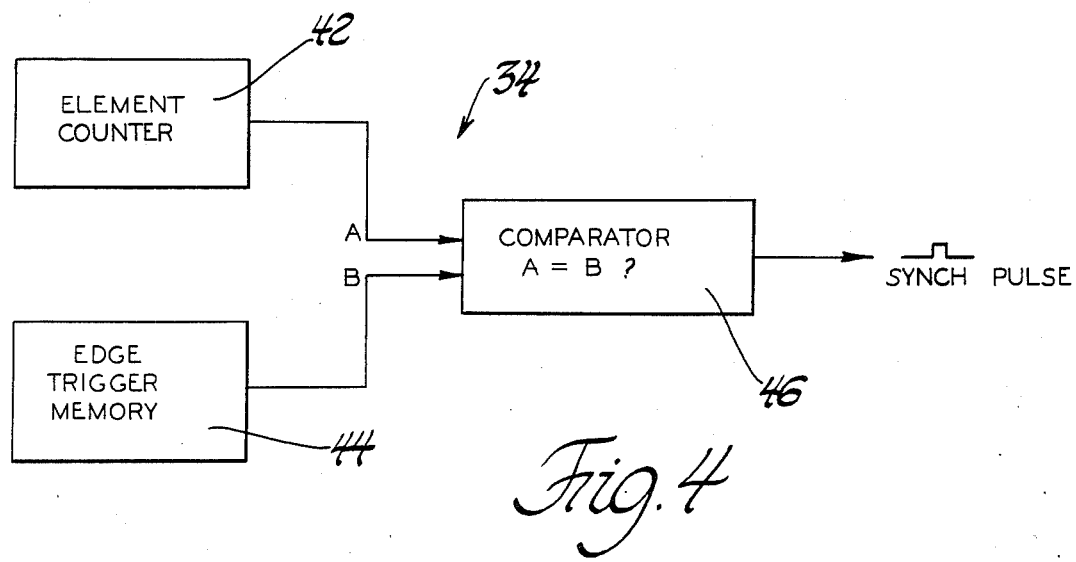

The above and other advantages will become more apparent from the following description taken in conjunction with the accompanying drawings wherein like reference numerals refer to like parts and wherein:

FIG. 1 is an isometric view of a part inspection system incorporating a machine vision apparatus for acquiring the image of a moving object according to the invention, FIG. 2 is a schematic illustration of the relationship of the fields of view of the linear cameras in the system of FIG. 1 and the object being sensed, FIG. 3 is a block diagram of the machine vision apparatus according to the invention, and FIG. 4 is a block diagram of the synch generator portion of the apparatus of FIG. 3.

Referring to FIG. 1, a semi-circular part 10 or object which is to be sensed by machine vision techniques slides down an inclined chute or track 12. The vision apparatus comprises two linear sensors or cameras positioned on one side of the track adjacent a viewing station and comprise a tracking camera 14 which views the part 10 along a line parallel to the path of movement of the part so that the progress of the part 10 past the viewing station is determined by the linear array sensing elements in camera 14 which views a salient portion such as a leading edge of the part. As a matter of design some other portion of the part may be selected for tracking purposes depending on the part geometry. A profiling camera 16 is arranged with its sensors viewing a plane transverse to the path of the part and preferably perpendicular to the path of the part so that as the part progresses past the field of view of the camera 16 the entire profile of the part passes through the field of view of that sensor. Both cameras are coupled to a vision processor 18. The processor 18 has the function of responding to the tracking signals from the tracking camera 14 to store the camera 16 output at discrete times during the progress of the part 10 through its field of view thereby sampling slices of the object profile in a plane transverse to its path of movement. The vision processor 18 then stores the data to accumulate an electronic image of the object and/or it operates on the data to determine whether the shape and dimensions of the part 10 are acceptable in accordance with predetermined standards.

A wide area light source 20 on the opposite side of the track 12 from the cameras 14 and 16 provides back lighting for the part so that the cameras sense a silhouette of the object. The sides of the chute 12 are transparent at least in the camera fields of view. A mask 22 having an L-shaped slit 24 corresponding to the two linear fields of view of the cameras is positioned between the light source 20 and the cameras to prevent the glare of extraneous light on the cameras while presenting no interference to the camera vision. The back lighting presented by this arrangement is not essential since front lighting is also useful, as is side lighting, and may even be preferred in certain installations. In any event, a quartz halogen light source is preferred. High resolution is obtained using cameras such as Fairchild industrial line scan camera CCD1300R which has 1,024 elements in line. Other line scan cameras can be utilized depending upon the degree of resolution required. Of course the required field of view and the camera lens also influence the resolution of the image. An air activated reject unit 26 positioned down the track from the inspection station is actuated by the vision processor 18 to deflect any part 10 found to be defective into a reject bin 28 whereas parts which pass inspection are directed to a bin 30.

The imaging scene is illustrated in FIG. 2 which shows a line 14' representing the field of view of the camera 14 which line is divided into small segments or pixels whereas a similar line 16' perpendicular to the line 14' comprises a group of pixels representing the field of view of the profiling camera 16. In each case the pixels are shown to be relatively large for clarity thereby representing a low camera resolution in this simplified illustration. Both cameras are free-running subject to controller supervision. Thus the profiling camera continuously scans through its field of view to generate many line images of data, each line effectively representing a slice through the object. The entire amount of this data is not necessarily desired by the system so that the camera is selectively activated or triggered by gating the line image data to the processor 18. The gating is controlled by the tracking camera 14 which senses the light value passed to each sensing element. Whenever an element senses that the light level crosses a threshold value to signify that it senses the edge of the object, a position signal is emitted. For this illustration it is assumed that a new line image from camera 16 is desired the first time the object movement triggers a response from an element. When the part 10, moving toward the left as shown by the arrow 32, intercepts the first pixel "a" of line 14' the profiling camera 16 is triggered to output the line image of the portion of the object which aligns with line 16'. That scan which occurs at time $t_1$ is represented as an image line 16a and is held in memory or otherwise processed by the vision processor. When the next pixel "b" of line 14' shows that the part 10 has advanced to that position the profiling camera is again triggered resulting in the scan signal 16b at time $t_2$. The process continues until the whole object passes through the field of view 16'. Obviously the extent of the line 14' must at least equal the length of the part 10 in that direction, however, if only a portion of the part is subject to inspection then the line 14' may be shortened accordingly.

Where the inspection requires sampling of the object dimensions rather than total coverage, the profile image is not recorded for every pixel increment of the tracking line 14'. Rather many of them may be skipped to lower the resolution in the direction of movement thereby substantially reducing the amount of data that must be processed without reducing the resolution of the image in the transverse direction. Applicant's experience with the line cameras of 1,024 elements was that the profiling image was satisfactory when every tenth pixel of the tracking camera triggered the recording of a line image in the transverse plane. The spacing of the profile images does not have to be even so that if some portion of the object were of greater interest than other portions then a more dense pattern of profile images is recorded in that portion. In any event the chosen pattern of line scans is controlled by the position of the part being inspected rather than by a conveyor encoder or other indirect measure of object position or by time and every part is accurately scanned in the same manner.

Referring to FIG. 3 the vision processor 18 comprises a synch generator 34 which is coupled to the profiling camera 14 and the tracking camera 16, a RAM 36 coupled to the output of the profiling camera 14, a computer 38 coupled to the RAM 36, and a controller 40 for sequencing the RAM and synch generator operation. The synch generator 34, in turn, is illustrated in FIG. 4. An element counter 42 produces an output A signifying the number of the element of the tracking camera which detects the forward edge of the part 10. An edge trigger memory 44 contains a preprogrammed set of trigger position numbers or codes corresponding to those elements for which a profile image is desired. The trigger position numbers are output serially under direction of the controller 40 as the part progresses through the inspection station. The signals A and B are fed to a comparator 46 which issues a synch pulse to the profiling camera when the element counter output A equals the trigger position B. Then the next trigger position number is output as signal B in readiness for the element counter to output the corresponding element signal. Alternatively, the computer 38 stores the set of trigger position numbers and loads one number at a time into the memory 44, as needed, for presentation to the comparator 46. The profiling camera data is thus gated at specific object positions to output a stream of data representing the image at those planes of the object and the data is stored in RAM 36. The RAM may be configured to store all the line image of the object so that stored line images cumulatively represent the object image. That data is analyzed by the computer 38 to reach the objective of the inspection. For example, as shown in FIG. 1, the processor 18 would produce an output to activate the reject unit 26 whenever an unacceptable part passed the inspection station. A preferred manner of making the analysis is to store a model of the part in the computer by passing a master part through the inspection station and storing the profile images line-by-line in the same pattern as that desired for the part inspection, then when images are obtained on subsequent parts they are compared with the stored model line-by-line as soon as each line is acquired by the RAM 36 so that a near real time decision can be made on the acceptability of the part dimension. For that process the RAM 36 needs to store only the most recent line image.

In practice it has been found that the track 12 of FIG. 1 when inclined at an angle of 30° passes the part 10 through the inspection station at a velocity of 30 to 40 inches per second. With parts 10 of the kind shown about 1 ¼ inches long and with about 100 line images acquired for each part, one or more parts per second can be processed by the machine vision system. The part acceptability decision can be made and the reject unit activated within 100 milliseconds if required.

It will thus be seen that this invention provides a method and apparatus for rapidly and accurately acquiring images of moving parts, the image having a very high resolution with a minimal amount of data representing the image. It also provides a method and apparatus for comparing the acquired image line-by-line in near real time with a stored model of the part to determine part accuracy.

The embodiments of the invention in which an exclusive property or privilege is claimed are defined as follows:

1. Machine vision apparatus for acquiring the image of a moving object comprising;
   means for moving the object along a predetermined path,
   a first linear sensor arranged to track the progress of the object along the path and for generating signals representing object position,
   a second linear sensor arranged to sense portions of the object in a plane transverse of the path for generating streams of data representing line images in the plane, and
   synchronizing means coupled to the sensors and responsive to the signals for outputting streams of data from the second sensor at predetermined object positions whereby as the object advances through the plane the second sensor obtains many line images which cumulatively represent an image of the object.

2. Machine vision apparatus as described in claim 1 wherein the first linear sensor is a first array of photodetector elements arranged to view the object along a line parallel to the path so that the elements sequentially detect a salient feature of the object, and the second linear sensor is a second array of photodetector elements arranged to sequentially view a plurality of slices of the object generally perpendicular to the path.

3. Machine vision apparatus as described in claim 2 where the synchronizing means comprises; a counter for emitting a counter signal identifying each element of the first sensor which detects the salient feature of the object, memory means storing codes corresponding to the counter signals for selected elements to trigger the output from the second sensor, and comparator means responsive to the counter signal and the stored codes for emitting a synch pulse to output the streams of data from the second sensor, whenever the counter signal matches one of the codes.

4. Machine vision apparatus for acquiring the image of a moving object and detecting the object profile comprising;

means for moving the object along a predetermined path, a first linear sensor arranged to track the progress of the object along the path and for generating signals representing object position, a second linear sensor arranged to sense object information in a plane transverse of the path, synchronizing means coupled to the sensors and responsive to the signals for outputting information from the second sensor at predetermined object positions whereby the second sensor obtains many sets of object information as the object advances through the plane, and means for processing the sets of information to determine the profile of the object.

5. Machine vision apparatus for acquiring the image of a moving object and comparing the image to a model comprising;

means for moving the object along a predetermined path, a first linear sensor arranged to track the progress of the object along the path and for generating signals representing object position, a second linear sensor arranged to sense object information in a plane transverse of the path, synchronizing means coupled to the sensors and responsive to the signals for outputting information from the second sensor at predetermined object positions whereby the second sensor obtains many sets of object information representing the image as the object advances through the plane, means for storing data representing a model, and means for processing the sets of information to compare the image to the model.

6. A machine vision method of acquiring the image of an object comprising the steps of;

moving the object through a predetermined path, sensing the position of the object at an array of points along the path to produce position signals, and in response to the position signals sequentially sensing line images of the object in a plane transverse to the path to obtain a plurality of line images which cumulatively represent the object image.

7. A method as claimed in claim 6 wherein the said array of points is arranged parallel to the path so that the points sequentially sense the same portion of the object, and wherein the said transverse plane is substantially perpendicular to the path.

8. A machine vision method of acquiring the image of an object comprising the steps of;

moving the object in a predetermined path through an inspection station, back lighting the object at the inspection station, sequentially sensing an edge of the silhouette of the object at a line of points to produce position signals as the object moves through the inspection station, and in response to the position signals, sensing at spaced object positions line images of the object shadow to obtain a plurality of line images which cumulatively represent the image of the object shadow.

* * * * *